(12) United States Patent
Rashidi Doust

(10) Patent No.: US 11,913,629 B1
(45) Date of Patent: Feb. 27, 2024

(54) FIRE RATED LIGHT FIXTURE

(71) Applicant: ELITE LIGHTING, Commerce, CA (US)

(72) Inventor: Hamid Rashidi Doust, Beverly Hills, CA (US)

(*) Notice: Subject to any disclaimer, the term of this patent is extended or adjusted under 35 U.S.C. 154(b) by 0 days.

(21) Appl. No.: 18/092,401

(22) Filed: Jan. 2, 2023

(51) Int. Cl.
*F21V 25/12* (2006.01)
*F21Y 115/10* (2016.01)
*F21Y 103/33* (2016.01)
*F21S 8/02* (2006.01)

(52) U.S. Cl.
CPC .............. *F21V 25/12* (2013.01); *F21S 8/026* (2013.01); *F21V 2200/20* (2015.01); *F21Y 2103/33* (2016.08); *F21Y 2115/10* (2016.08)

(58) Field of Classification Search
CPC ...... F21V 25/12; F21V 2200/20; F21S 8/026; F21Y 2103/33; F21Y 2115/10
See application file for complete search history.

(56) References Cited

U.S. PATENT DOCUMENTS

| | | | |
|---|---|---|---|
| 2022/0065410 A1* | 3/2022 | Huang | F21V 23/008 |
| 2023/0296229 A1* | 9/2023 | Chaimberg | F21V 13/04 362/404 |

* cited by examiner

*Primary Examiner* — Anne M Hines
*Assistant Examiner* — Jose M Diaz
(74) *Attorney, Agent, or Firm* — Payam Moradian

(57) ABSTRACT

Provided is Provided is a light fixture comprising: a body made from a metal; a circular LED board; a plurality of led light sources placed on the board, the LED light sources illuminating in an inwardly direction; a light guide positioned directly in front of the LED lights in such configuration that light from the LED light sources travels to inside of the guide through a side of the light guide; a reflective paper positioned above the light guide; a lens below the light guide; a ring below the lens for keeping the lens in place; and clips attached to the body for securing the light fixture in place.

17 Claims, 10 Drawing Sheets

FIRE RATED LIGHT FIXTURE

BACKGROUND SECTION OF THE INVENTION

Recessed luminaries are placed in the ceiling. There is a need to contain a fire in a luminaire. Otherwise a fire from one luminaire in a ceiling can spread to a floor above the ceiling where the luminaire is placed.

To address this issue, generally an enclosure is built around a recessed light. These enclosures include a fire box that surrounds the recessed light. The problem with fire boxes is that multiple subcontractors may be needed to install a recessed light. The fire boxes may not be designed for standard 2×8 joist construction, requiring larger joist that may be more expensive to construct. Due to the size of the box, recessed lights cannot be installed in close proximity to each other or close to the wall. The fire box can only be installed along a long axis. Furthermore, requiring installing the fie box first and then installing the recessed light inside the box can cause delays in construction, and increases the overall costs of labor and material. The use of a fire box may use additional materials such as drywall, caulk, gaskets, hats and joint tape. Lastly, because a box must be made from drywall around each recessed lighting, additional clearance is needed, thereby limiting location.

There is a need in the art for a fire rated light fixture that addresses the above issues.

SUMMARY SECTION OF THE INVENTION

Provided is Provided is a light fixture comprising: a body made from a metal; a circular LED board; a plurality of led light sources placed on the board, the LED light sources illuminating in an inwardly direction; a light guide positioned directly in front of the LED lights in such configuration that light from the LED light sources travels to inside of the guide through a side of the light guide; a reflective paper positioned above the light guide; a lens below the light guide; a ring below the lens for keeping the lens in place; and clips attached to the body for securing the light fixture in place. The metal can be steel. The body can be circular, and have an outwardly flange. The body can have an upwardly portion at tip of the flange. The body can have a depression on a top of the body. The depression can be partially circular. The depression can have a circular portion and an inwardly curving portion. The light fixture can further comprise clips attached to a top of the body. Only the depression of the body can touch the reflective paper from a top of the reflective paper. The ring can be made from plastic. The ring is not rigid. The body can have a height of 17 to 20 mm. The light fixture can be fire-rated.

Provided is a light fixture comprising: a body made from steel; a circular LED board; a plurality of led light sources on the board, the LED light sources illuminating in an inwardly direction; a light guide positioned directly in front of the LED lights in such configuration that light from the LED light sources travels to inside of the guide through a side of the light guide; and a reflective paper above the light guide. The body can have a depression on its top to maintain the reflective paper in place. The body can have a height of 17 to 20 mm, and the depression has a height of 3 mm to 7 mm. The body has an outwardly flange portion on its bottom.

Provided is a light fixture comprising: a body with a top, a circular sidewall, and an outwardly flange portion, the body made from steel; a circular LED board; a plurality of led light sources on the board, the LED light sources illuminating in an inwardly direction; a light guide positioned directly in front of the LED lights in such configuration that light from the LED light sources travels to inside of the guide through a side of the light guide; a reflective paper above the light guide; a lens below the light guide; a ring below the lens for keeping the lens in place; wherein the body has a depression on its top that comes downwardly and contacts the reflective paper; and clips attached to the top of the body for securing the body to a ceiling. The body can have a height of 17 to 20 mm, and the depression has a height of 3 mm to 7 mm. The light fixture is fire-rated.

DETAILED DESCRIPTION OF THE INVENTION

Figure 1:
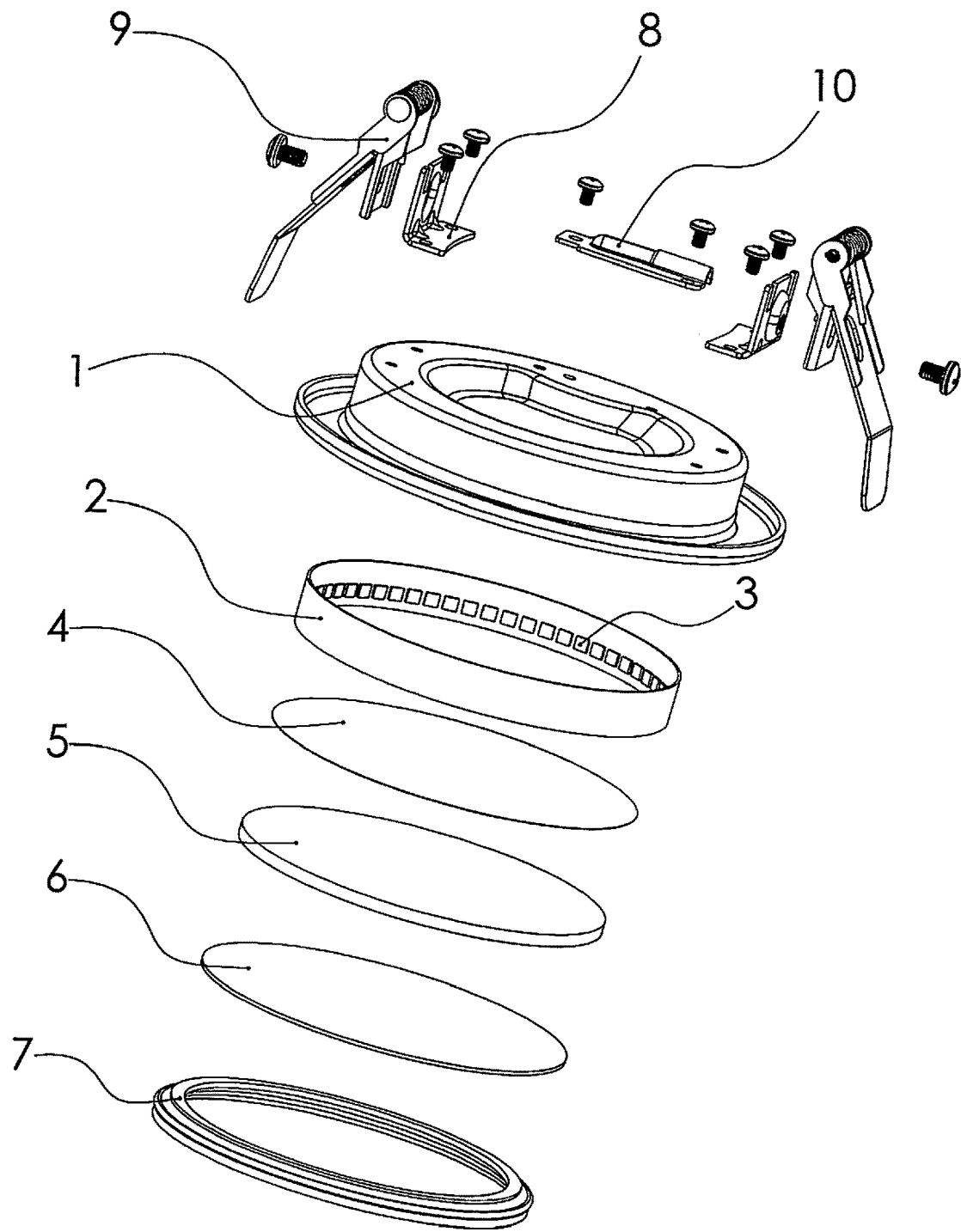
FIG. 1 illustrates an exploded view of the fire resistant light fixture.

Provided is a thin fire rate rated recessed light fixture. FIG. 1 illustrates an exploded view of the fire-resistant light fixture. The light fixture has a body 1. The body 1 can be made from a metal with a high melting point, such as steel. The body 1 can be made a uniform cast steel. The body 1 can have a circular side wall, a closed top, and an open bottom. A flange portion can extend from the bottom portion of the sidewall to all around the side wall. The tip of the flange portion can further have an upwardly portion all around the outside tip of the flange portion.

The top of the body 1 is closed. The center part of the body 1 can have a downwardly depression. The depression can be circularly shaped other than fora portion where the wire leaves the body 1. The body 1 can have fastener openings on top for attaching clip holder 8 and wire guide 10.

A circular LED board 2 configured to rest on one of its sides is placed inside of body 1 against the sidewall of the body 1. Reflective paper 4 rests below and against a depression on the top of the body 1. LED lights sources 3 are placed on the inner side of the LED Board 2.

Light guide 5 which is typically made from transparent glass or plastic that is placed directly, in front of the LED light sources 3. The body 1 is circular and can have a height of 15 mm to 22 mm, such as 17 mm to 20 mm, such as 18.5 mm. The depression can have a height of 3 mm to 7 mm, such as about 5.5 mm.

The light from the LED light sources 3 travels to inside of the light guide 5 from the sides of the light guide 5. The light then leaves the light guide 5.

A lens 6 is placed below the light guide 5. The diffuser lens 6 can be made from plastic or glass. The diffuser lens 6 can be a translucent or semi-transparent cover that spreads out or scatters light. The diffuser lens 6 can control brightness and give off a soft light.

A ring 7 is placed below the lens 6. The ring 7 can be made from a non-metallic material such as plastic with a high melting point, and is pushed against inside of body 1. The plastic can have high tear and tensile strength, and resistant to high temperatures. The ring 7 can be manipulated by hand (the plastic is not rigid), and is stretchable. The ring 7 is attached tightly without a fastener to inside of the body 1, and keeps the components of the body 1 inside of the body 1.

The top of the body 1 can have two openings on opposite sides for attachment of clip holders 8. Clips 9 can be attached to clip holder 8. Each clip 9 can have a spring for keeping the clip 9 in place. The clip holder 8, clip 9 and its spring, as well as all the fasteners can be made from steel and be resistant to melting in the event of a fire.

The top of the body 1 can have a circular depression, all along or partially on top of the body. As illustrated, the top of the body 1 has a partially circular depression. The non-circular portion that curves inwardly is positioned next to where a wire comes out of the body 1. An opening exists on top of the body 1 for a wire come out. Wire guide 10, which can be made from steel, is fastened to two openings on the body 1, and covers the wire opening and the wire.

Figure 2:
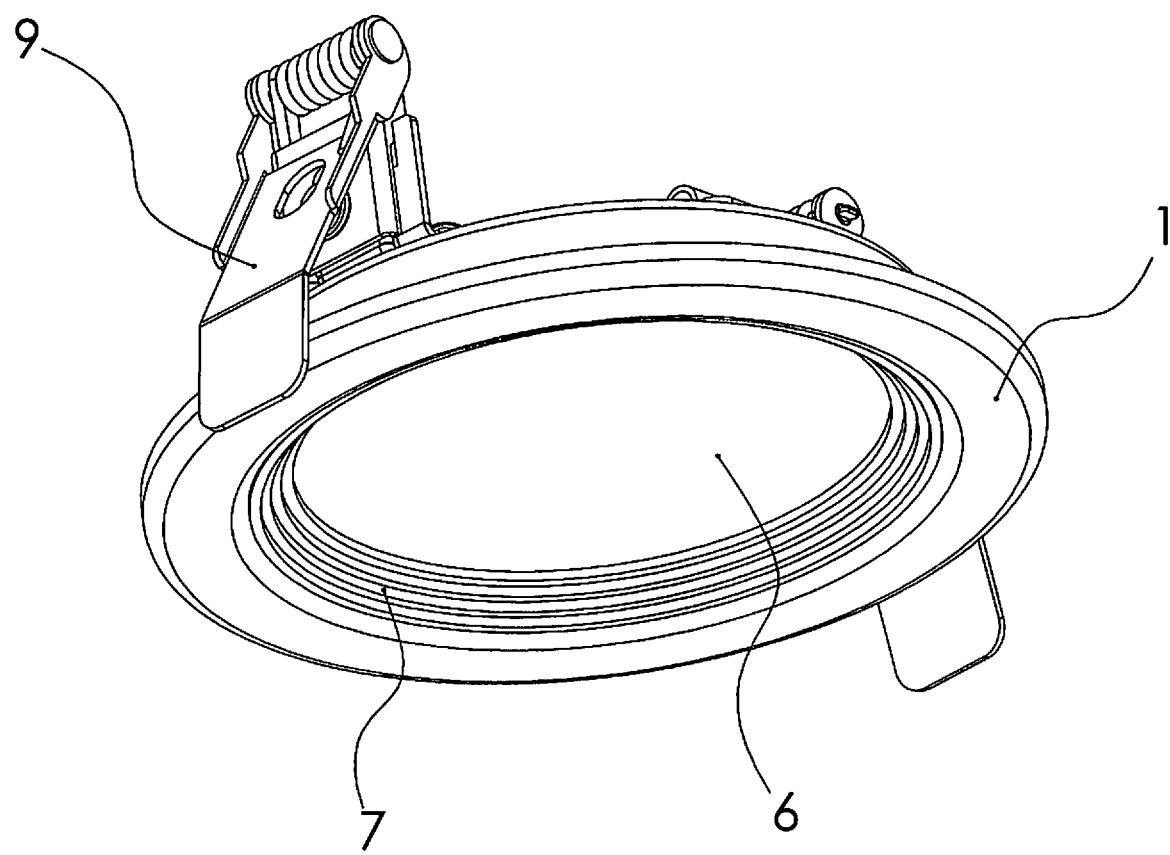
FIG. 2 illustrates a bottom perspective view of the light fixture.

FIG. 2 illustrates a bottom perspective view of the light fixture. Illustrated in this view are clips 9, body 1, lens 6, and ring 7.

Figure 3:
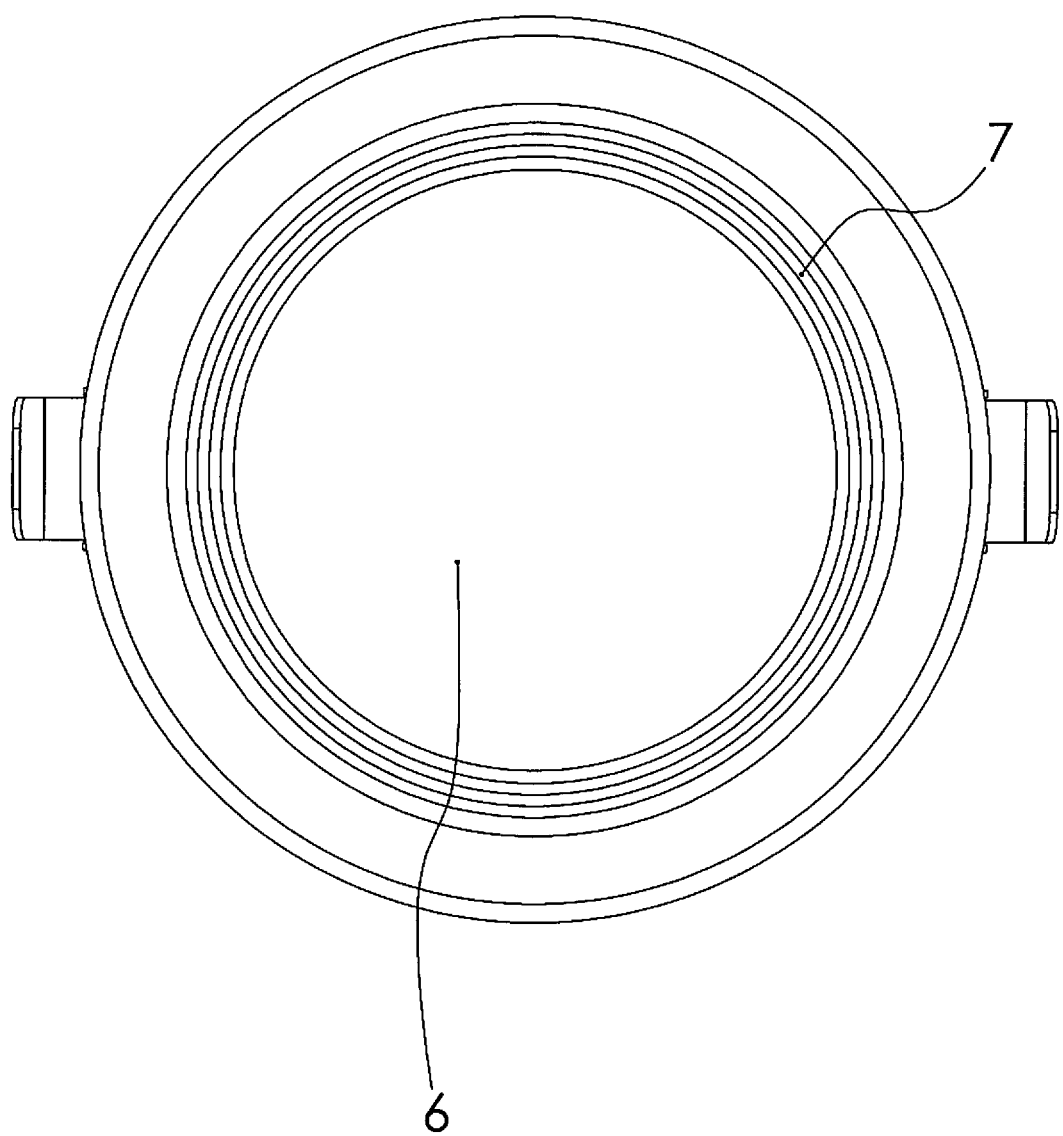
FIG. 3 illustrates a bottom view of the light fixture.

FIG. 3 illustrates a bottom view of the light fixture. Visible in this view are the lens 6 and ring 7.

Figure 4:
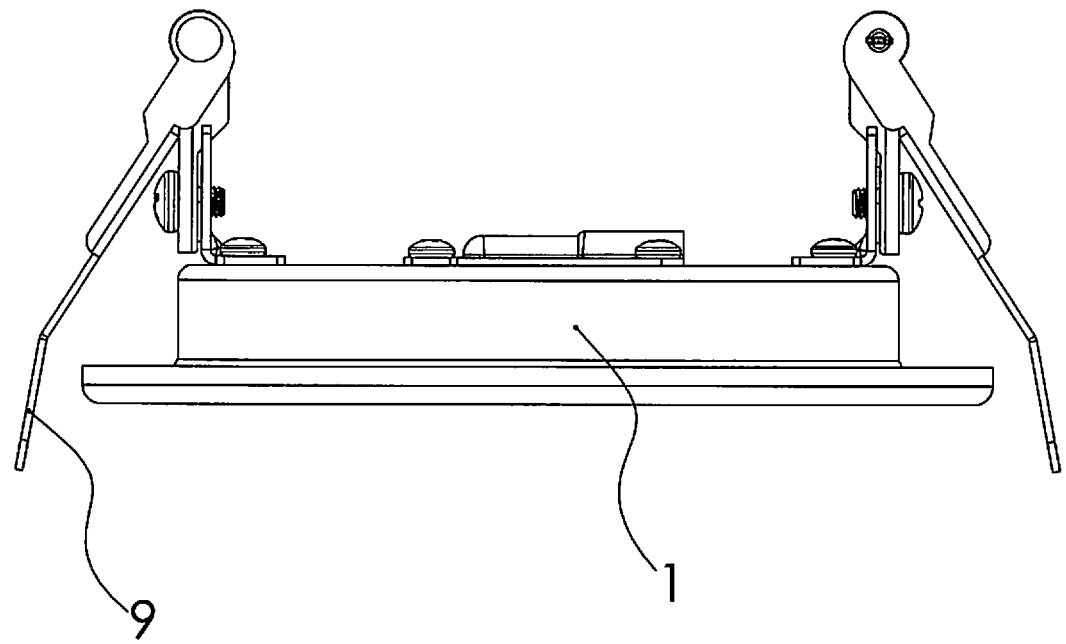
FIG. 4 illustrates a side view of the light fixture.

FIG. 4 illustrates a side view of the light fixture. Visible in this view are body 1 and clip 9.

Figure 5:
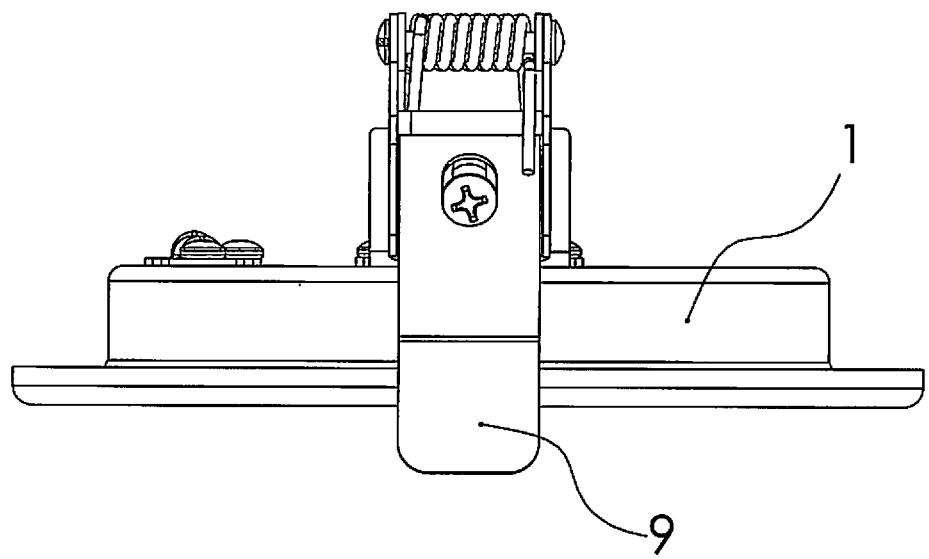
FIG. 5 illustrates a side view of the light fixture.

FIG. 5 illustrates aside view of the light fixture. Visible in this view are body 1 and clip 9.

Figure 6:
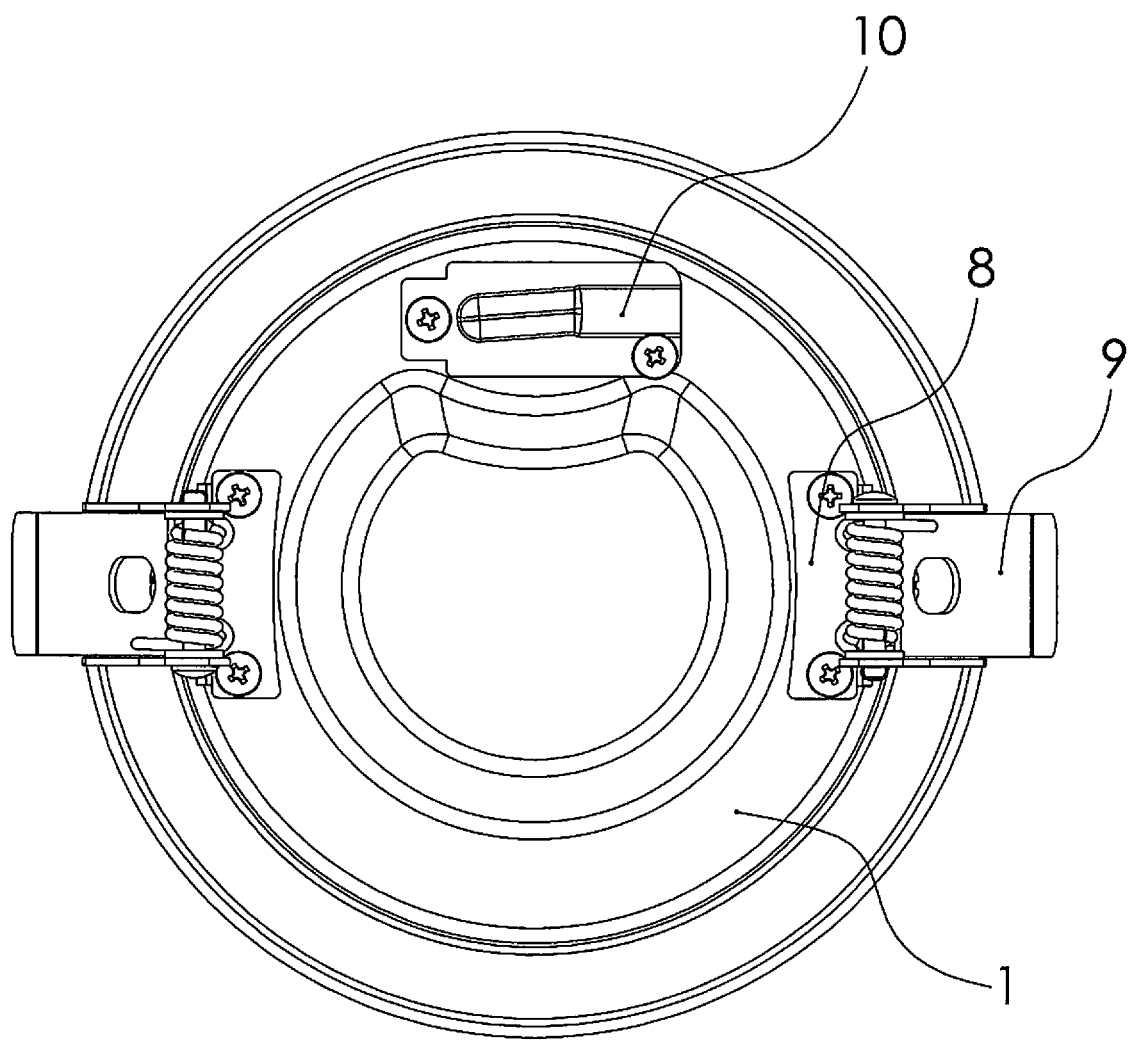
FIG. 6 illustrates a top view of the light fixture.

FIG. 6 illustrates a top view of the light fixture. Illustrated in this view are body 1, clip holder 8, clip 9, and wire guide 10. Visible in this view is the circular depression on the top of body 1 with a partially inwardly curved portion.

Figure 7:
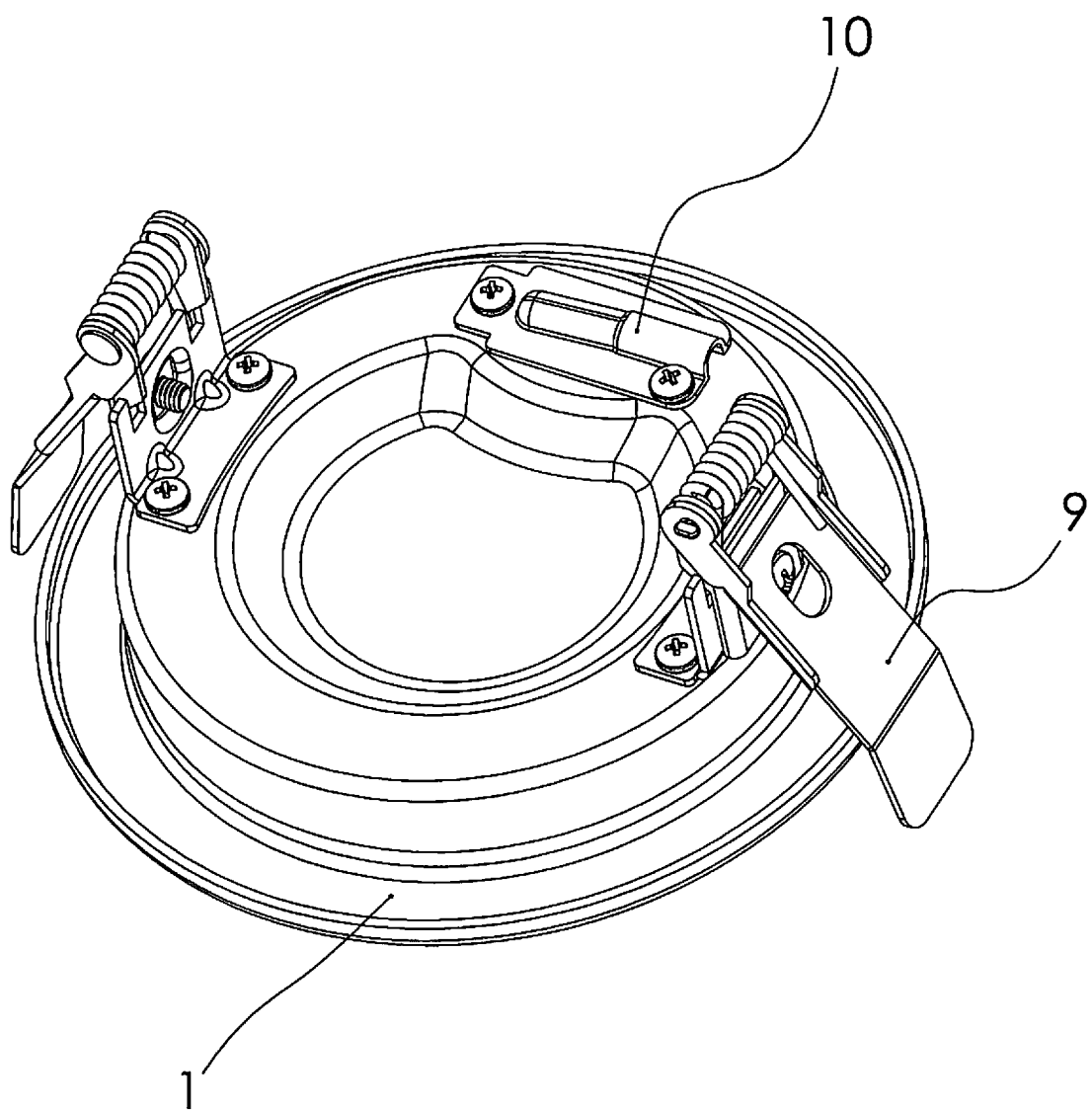
FIG. 7 illustrates a top perspective view of the light fixture.
Figure 8:
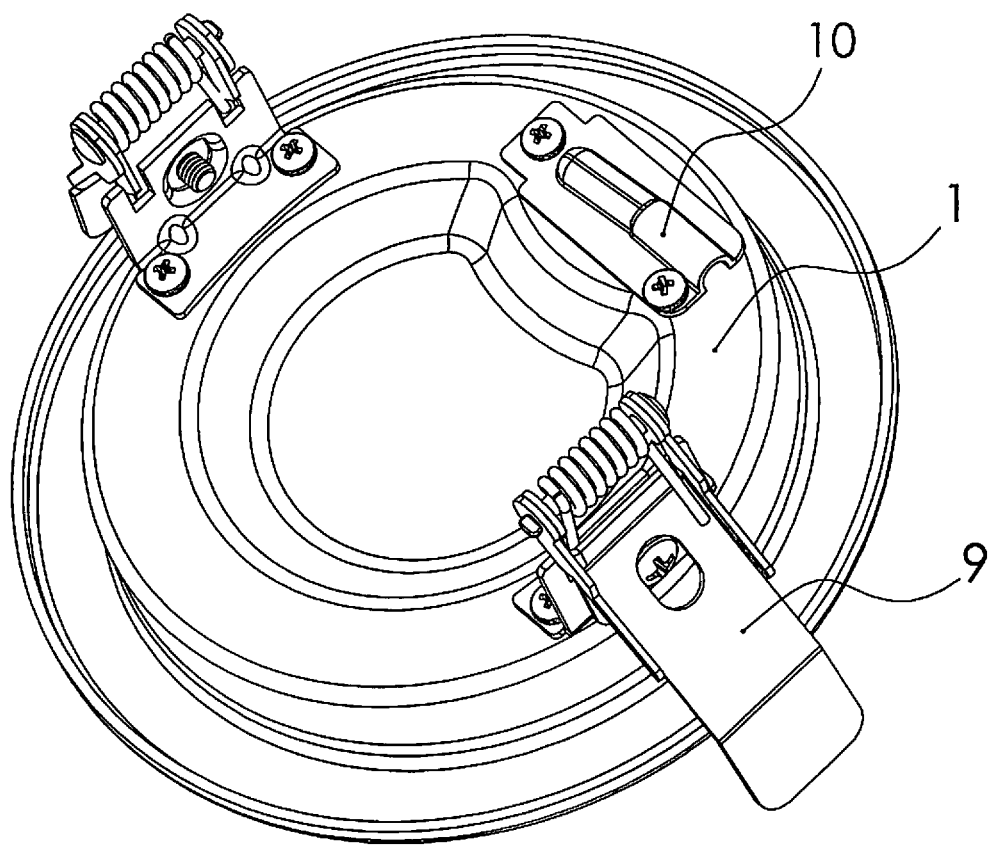
FIG. 8 illustrates a top perspective view of the light fixture.

FIGS. 7 and 8 illustrate a top perspective view of the light fixture. Illustrated in this view are wire guide 10, clip 9, and body 1.

Figure 9:
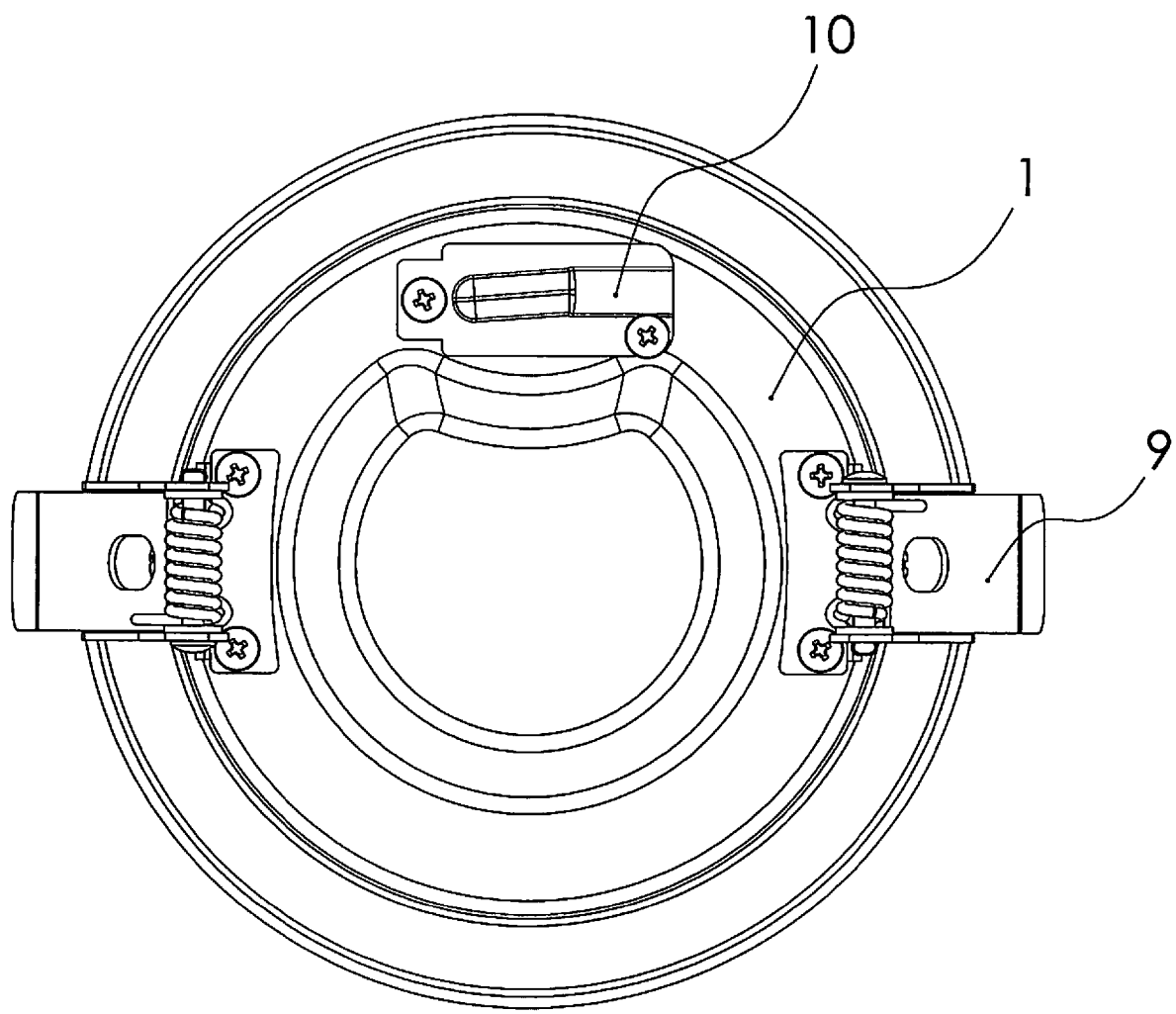
FIG. 9 illustrates a top plan view of the light fixture.

FIG. 9 illustrates a top plan view of the light fixture. Illustrated in this view are wire guide 10 clip 9, and body IL.

Figure 10:
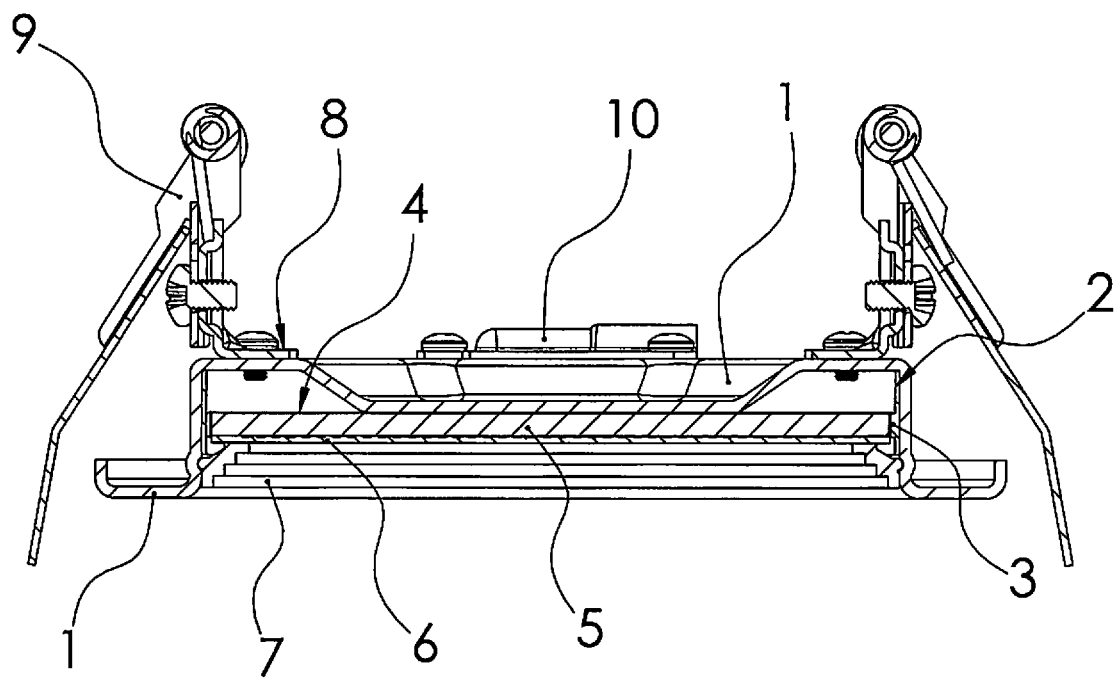
FIG. 10 illustrates a cut-off view of the light fixture.

FIG. 10 illustrates a side cut-off view of the light fixture. As shown, the reflective paper 4 is placed inside of the body and the top of the reflective paper 4 contacts the bottom of the top portion of the body 1. Specifically, the top of the reflective paper 4 contacts the bottom of the depression formed on the top of the body. Light guide 5 is placed under the reflective paper 4. The reflective paper 4 makes contact along all of the top of the light guide 5, and makes the light reflect downwardly. The sides of the light guide 5 are positioned directly against the LED light sources 3, making the light move into the light guide 5 from the sides.

The light fixture can be 3 or 4 or 6 inch fire rated round slim LED. It can be 8 w, 12 w, or It can produce 500 to 1100 lumens. It can have TRIAC dimming controls. It can have LEDs with multiple colors, and produce light of 27 k/30 k/35 k/40 k/50 k 90 cri white.

As used herein, fire-resistant or fire rated means complying with a 2-hour fire rating test, based on at least any one of these standards: UL 263, ASTM E119 and CAN ULC S101.

Fire Rated
1. Body
2. LED Board
3. LED light source (Light Emitting Diode)
4. Reflective paper
5. Light guide glass
6. Diffusion Lens
7. Ring
8. Clip holder
9. Clip
10. Wire guide

What is claimed is:

1. A light fixture comprising:
a) a body made from a metal;
b) a circular LED board;
c) a plurality of LED light sources placed on the board, the LED light sources illuminating in an inwardly direction;
d) a light guide positioned directly in front of the LED lights in such configuration that light from the LED light sources travels to inside of the guide through a side of the light guide;
e) a reflective paper positioned above the light guide;
f) a lens below the light guide;
g) a ring below the lens for keeping the lens in-place; and
h) clips attached to the body for securing the light fixture in place;
wherein the body has a depression on a top of the body,
wherein only the depression of the body touches the reflective paper from a top of the reflective paper.

2. The light fixture of claim 1, wherein the metal is steel.

3. The light fixture of claim 1, wherein the body is circular, and has an outwardly flange.

4. The light fixture of claim 3, further comprising an upwardly portion at tip of the flange.

5. The fixture of claim 1, wherein the depression is partially circular.

6. The light fixture of claim 1, wherein the depression has a circular portion and an inwardly curving portion.

7. The light fixture of claim 1, further comprising clips attached to atop of the body.

8. The light fixture of claim 1, wherein the ring is made from plastic.

9. The light fixture of claim 8, wherein the ring is not rigid.

10. The light fixture of claim 1, wherein the body has a height of 17 to 20 mm.

11. The light fixture of claim 1, wherein the light fixture is fire-rated.

12. A light fixture comprising:
a) a body made from steel;
b) a circular LED board;
c) a plurality of LED light sources on the board, the LED light sources illuminating in an inwardly direction;
d) a light guide positioned directly in front of the LED lights in such configuration that light from the LED light sources travels to inside of the guide through a side of the light guide,
e) a reflective paper above the light guide; and
f) a lens below the light guide;
wherein the body has a depression on its top to maintain the reflective paper in place;
wherein only the depression of the body touches the reflective paper from a top of the reflective paper.

13. The light fixture of claim 12, wherein the body has, a height of 17 to 20 mm, and the depression has a height of 3 mm to 7 mm.

14. The light fixture of claim 12, wherein the body has an outwardly flange portion on its bottom.

15. A light fixture comprising:
a) a body with a top, a circular sidewall, and an outwardly flange portion, the body made from steel;
b) a circular LED board;

e) a plurality of LED light sources on the board, the LED light sources illuminating in an inwardly direction;

d) alight guide positioned directly in front of the LED lights in such configuration that light from the LED light sources travels to inside of the guide through, a side of the light guide, e) a reflective paper above the light guide;

f) a lens below the light guide;

g) a ring below the lens for keeping the lens in place;

wherein the body has a depression on it stop that comes downwardly and contacts the reflective paper; and h) clips attached to the top of the body for securing the body to a ceiling;

wherein only the depression of the body touches the reflective paper from a top of the reflective paper.

16. The light fixture of claim 15, wherein the body has a height of 17 to 20 mm, and the depression has a height, of 3 mm to 7 mm.

17. The light fixture of claim 15, wherein the light fixture is fire-rated.

\* \* \* \* \*